United States Patent [19]

Turner

[11] Patent Number: 4,620,660

[45] Date of Patent: Nov. 4, 1986

[54] METHOD OF MANUFACTURING AN INTERNALLY CLAD TUBULAR PRODUCT

[76] Inventor: William C. Turner, 85 Pinto La., Sedona, Ariz. 86336

[21] Appl. No.: 694,347

[22] Filed: Jan. 24, 1985

[51] Int. Cl.⁴ .............................................. B23K 31/02
[52] U.S. Cl. ................................... 228/186; 228/132; 228/158; 228/221; 228/219; 285/286
[58] Field of Search .............. 228/186, 265, 132, 158, 228/219, 221, 153; 285/55, 286

[56] References Cited

U.S. PATENT DOCUMENTS

| | | | |
|---|---|---|---|
| 930,927 | 8/1909 | Berkstresser | 228/132 |
| 2,508,465 | 5/1950 | Offinger | 228/132 |
| 2,792,490 | 5/1957 | Risch | 285/286 |
| 3,066,393 | 12/1962 | Malagari | 228/186 |
| 3,121,949 | 2/1964 | Wright | 228/186 |
| 3,538,594 | 11/1970 | Wilkes | 285/286 |
| 3,766,633 | 10/1973 | Lehrheuer | 285/286 |
| 4,023,936 | 5/1977 | Morse | 228/186 |
| 4,162,758 | 7/1979 | Mikarai | 228/158 |
| 4,519,537 | 5/1985 | Heinrich | 228/221 |

FOREIGN PATENT DOCUMENTS

| | | | |
|---|---|---|---|
| 0020248 | 8/1976 | Japan | 228/132 |
| 0028785 | 7/1980 | Japan | 228/219 |
| 0103790 | 6/1982 | Japan | 228/158 |
| 0159284 | 9/1984 | Japan | 228/194 |

*Primary Examiner*—Nicholas P. Godici
*Assistant Examiner*—K. Rowan
*Attorney, Agent, or Firm*—Head, Johnson & Stevenson

[57] ABSTRACT

A method of manufacturing an internally clad tubular product employing a tubular host such as steel, including the steps of plating the internal surface of the tubular host with a low melting point bonding metal alloy, inserting a tubular clad member, such as of nickel base alloy, into the plated tubular host, circumferentially welding one end of the cladding member to one end of the host member directly and welding the other ends in such a manner as to incorporate a metallic gas reservoir, thus forming a subassembly, evacuating the annular space formed in the subassembly between the exterior of the cladding member and the interior of the tubular host of water vapor and oxygen, heating the subassembly to about 1650° to 2000° F. thereby melting the bonding metal alloy, and hot rolling the heated subassembly to metallically bond the cladding member to the tubular host by means of the mechanism of liquid interface diffusion bonding.

25 Claims, 1 Drawing Figure

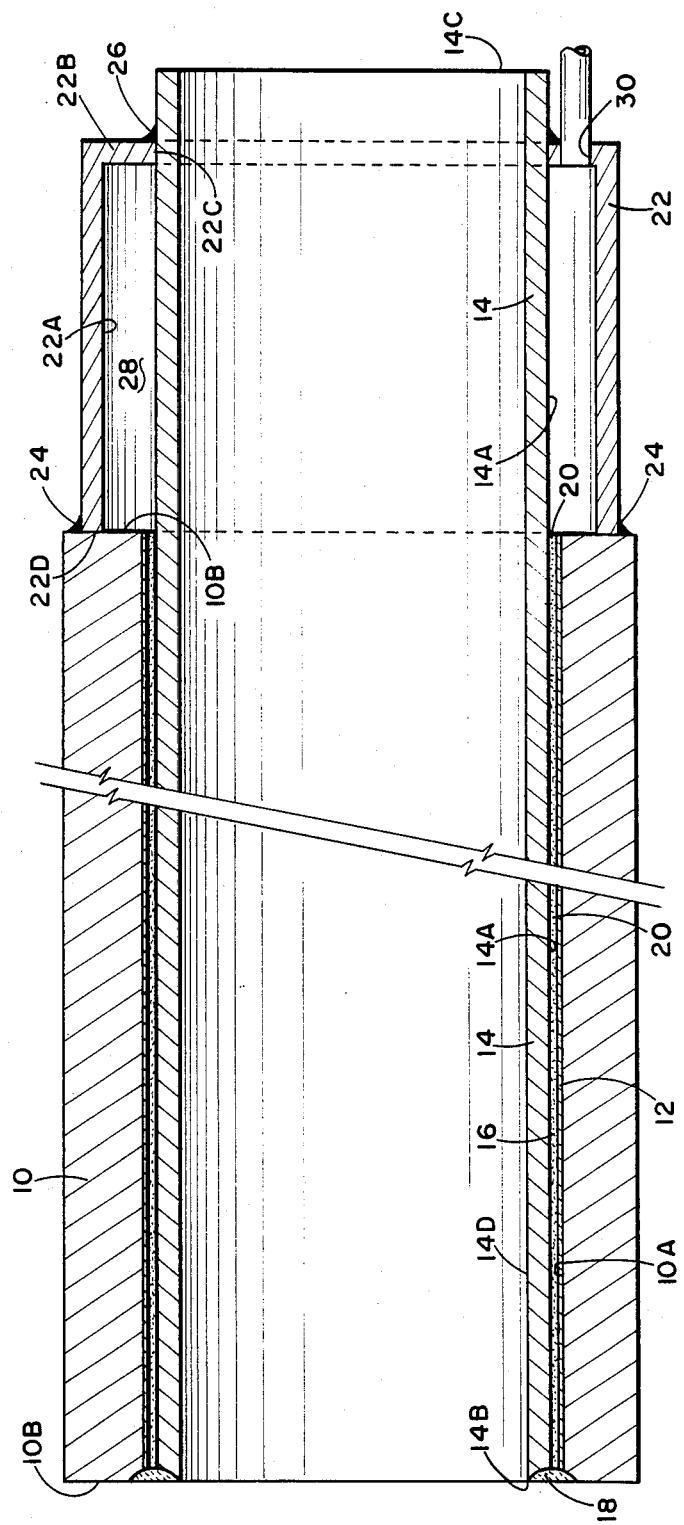

METHOD OF MANUFACTURING AN INTERNALLY CLAD TUBULAR PRODUCT

SUMMARY OF THE INVENTION

The present invention is directed towards a method of manufacturing a clad tubular product. There exists in industry a need for tubular products in which the surfaces are formed of a material which is resistive to corrosive fluids and gases and sometimes which are also resistive to corrosive materials.

An example of a need which currently exists for tubular products having the strength and economy of steel but having the corrosive resistance characteristics of nickel base alloy or other more expensive materials is that of transporting sour gas. Another need is for downhole and line applications in geothermal wells.

In order to obtain full advantage of the corrosive resistance characteristics and strengths of special materials and the strength and economy of steel it is necessary that the two metals be metallically bonded. In order to achieve a metallic bond two metals having very clean surfaces are placed in intimate contact with each other and subjected to a combination of temperature and pressure, with the cleanliness maintained during this step. Metallic bonds have two basic advantages; that is, (a) they are of very high strength, generally the same as the metals being joined; and (b) they neither affect nor influence corrosion mechanisms. Others have attempted to merely place liners within tubular products, the liners not being metallically bonded to the host members. A major defect of this arrangement is that corrosion readily takes place between the exterior of the liners and the interior of the hosts and these corrosion pathways can soon result in the failure of the tubular products.

The present invention provides a method of making clad tubular products which can be accomplished as a part of the normal process for making seamless tubular materials; that is, the method can be practiced with minimal changes in existing modern steel mills. While the invention relates to basic concepts useful to metallically bond two metals, it will be described as the invention is particularly useful for manufacturing clad tubular products and, most specifically, internally clad tubular products. In the practice of the method of this invention in conjunction with a typical seamless mill, as an example, a tubular host is first formed. This can be achieved in a variety of ways but the typical way in which seamless tubular products are made is by casting cylindrical hosts which are pierced by a piercer to form a hollow cylindrical shell or tubular host which is of diameter greater than the finished product and of length less than the finished product. In the practice of the present invention these pierced cylindrical members, which are referred to in this description as tubular hosts, are employed to form a subassembly which is subsequently treated to form an internally clad tubular product. The first step in forming the subassembly is to plate the internal cyclindrical surface of the tubular host with a low melting point bonding metal alloy, such as nickel-phosphorus in the composition of about 88 to 98 percent by weight nickel and about 2 to 12 percent by weight phosphorus. This is best achieved by submerging the tubular host in an electroless plating bath.

A tubular cladding member, which may be made such as of nickel base alloys is next telescopically inserted into the tubular host. A first end of the cladding member is welded about its full circumference to a first one end of the tubular host to form the subassembly. Next, the annular space formed in the subassembly between the exterior of the cladding member and the interior of the tubular host is evacuated of water vapor and oxygen. This is achieved by first applying a vacuum to the space followed by filling it with an inert gas, such as argon. Nitrogen may be substituted for argon. This sequence may be repeated as necessary to obtain the condition wherein the water and oxygen dew point in the space is about −60° F. This can best be accomplished by welding a circumferential bag member between the second end of the tubular host and the second end of the tubular cladding member. The circumferential bag member has a small diameter opening therein providing means of evacuating the annular space and filling it with inert gas in the sequence necessary to rid the space of all substantial water and oxygen.

In some instances, depending upon the materials and the temperatures and the pressures employed in subsequent steps, it may be desirable to include a flux material between the plated internal surface of the tubular host and the external surface of the cladding member. This can be accomplished by coating the external surface of the cladding member with a flux before it is inserted into the tubular host.

The subassembly with the inert gas in the annular space is then heated to a temperature sufficient to melt the bonding metal alloy which should be between about 1650° F. and 2000° F. While at such temperature the subassembly is hot rolled in a mill, such as a mandrel mill, to metallically bond the cladding member to the tubular host.

The gas bag not only aids pump down but also provides a reservoir for the gases and excess bonding metal as displaced during hot rolling. The sealed condition of the faying surfaces is required to prevent contamination during this rolling step, as well as during heating in the furnace.

The bonding metal is required to achieve liquid interface diffusion bonding (LIDB). LIDB is required in order to affect metallic bonding within the temperature, pressure and time parameters of hot rolling. The melting point and reaction rates of the bonding metal are directly related to the exact composition of the bonding metal. The temperature and pressure of rolling will be empirically determined so as to eliminate the gap between the host and cladding material without damage of and undue stress to, either material. The exact composition of the bonding metal will be selected to suit these developed temperatures, pressures and rolling rates.

After the metallic bond has been completed the product, still heated, if run through a stretch reducing step as is typical in the manufacture of seamless tubular products to obtain a preselected ID and OD. After cooling, the internally clad tubular product is then cut to length, and straightened, more or less as the standard seamless tubular product is handled in todays modern mill process. Any customary heat treating would also be performed.

DESCRIPTION OF THE DRAWING

The FIGURE is a fragmentary cross-sectional view of a subassembly as employed in the method of manufacturing internally clad tubular products showing the stage in the process in which the subassembly is ready to be heated and hot rolled in a mill.

DESCRIPTION OF THE PREFERRED EMBODIMENT OF THE INVENTION

While the invention may be practiced in other ways, it will be described as it is particularly applicable to the manufacture of internally clad tubular products in conjunction with the well known method of manufacturing seamless tubing in a mandrel mill. In a mandrel mill seamless tubing is manufactured by first producing by casting a solid cylindrical billet which is heated in a rotary hearth furnace. The billet is then longitudinally pierced by a piercer to form a hollow shell. This hollow shell is rolled in a mandrel mill thus forming what is referred to as "mother" pipe. The mother pipe is, while still heated, formed to the required diameters by stretch reducing.

This invention starts with the round billet after it has been pierced to produce a hollow shell which forms a tubular host. In some manufacturing processes the billet is "pierced" twice and in this case the hollow shell or host product will be employed after the second "piercing".

Referring to the drawing, the hollow tubular host is indicated by the numeral 10 and is typically formed of steel having the prescribed composition according to the ultimate intended use of the tubular product. The tubular host is of diameter greater than the ultimate diameter of the tubular product and of length less than the ultimate length of the finished tubular product. In addition, the wall thickness is greater than will be found in the finished product.

The tubular host 10 is removed from the standard mandrel mill process and the internal surface 10A is plated with a layer of a low melting point bonding metal alloy 12. This is best achieved by submerging the tubular host 10 in a cleaning bath followed by an electroless plating bath.

The low melting point bonded metal alloy may be nickel phosphorus, nickel boron, nickel chromium phosphorus, chromium phosphorus or mixtures of these alloys. A preferred alloy is nickel phosphorus composed of about 88 to 98 percent by weight nickel and about 2 to 12 percent by weight phosphorus. In some instances, an additional wetting aid is helpful and in such cases about 0.5 to 1 percent by weight boron may be employed in the plating alloy. The depth of the plating is not critical but may be to a thickness of about 0.0005 to about 0.002 inches. The exact composition will be determined by the hot rolling parameters.

A tubular cladding member 14 is next telescopically inserted into the plated host member 10. The tubing cladding member 14 has an external diameter 14A which is slightly less than the internal diameter 10A of the tubular host so that the cladding member slides freely into position within the host. In some instances it is desirable that a flux be employed, and if so, the flux will probably be applied to the external cylindrical surface 14A of the tubular cladding member. While other flux materials may be utilized a preferred material is cryolite.

The metallurgical terminology surfaces to be metallically joined are called "faying" surfaces. Thus, in the embodiment of this invention, as illustrated and described, the host cylindrical, internal surface 10A with the bonding metal alloy 12 plated thereon is one faying surface and the exterior surface 14A of the tubular cladding member, with or without a flux 16 thereon, is the other faying surface.

After insertion of the tubular cladding member 14 the first end 14B is welded to the host member 10 adjacent its first end 10B. The welding 18 is around the full circumference of the cladding member 14 and the host member 10B to form an airtight seal. The welding 18 does not have to be accomplished exactly at the end of the cladding member 14, that is, the cladding member 14 would probably extend somewhat beyond the end 10B of the host member. The essence of the welding step is to seal one end of an annular space 20 between the internal surface 10A of the host member and the exterior 14A of the cladding member, which annular space is closed at the other end by welding so as to incorporate the gas reservoir and seal the faying surfaces. The weld at the first end will also be structural and will transfer stresses between the two cylinders during rolling.

The next step is to remove from the annular space 20 water vapor and oxygen. This is achieved by first applying a vacuum to the annular space 20. One means of providing closed communication with the annular space is by the use of the circumferential bag 22. While the element 22 is referred to as "bag" or reservoir it is preferably of metallic material of an internal diameter at least equal to the internal diameter 10A of the tubular host. Bag 20 has a portion 22A. With the bag 22 in place a weld 24 is applied around the entire circumferential end 22D of the bag to seal it to the second end 10B of the host. A second weld 26 is then circumferentially applied to affix the bag to the external surface 14A of the cladding member. With the bag 22 thus welded in place closed communication is provided between the annular space 28 within the bag and the annular space 20 between the tubular host and the tubular cladding member.

A small diameter opening 30, which could be a pinch tube, is formed in bag 22 by which piping (not shown) may be attached.

By means of piping (not shown) the annular spaces 20 and 28 are subjected first to a vacuum to pull air from between the interior surface 10A of the host member and the exterior surface 14A of the cladding member.

Next, an inert gas, such as argon, is injected through the opening 30 to enter in and fill the annular space 20.

It is imperative that the annular space 20 between the interior surface of the host pipe and the exterior surface of the cladding member be substantially free of water and oxygen. By "substantially free" is meant that the space should be under conditions such that the water and oxygen dew point is at $-60°$ F. or below. To achieve this result the space may have to be evacuated, filled with inert gas, evacuated and refilled several times. When the water and oxygen levels in the annular space have been reduced to the accepted level the inert gas remaining in the annular space can be relatively low and preferably is that which is sufficient to help support the bag, that is resist collapsing of the bag, during the subsequent steps of heating and rolling the subassembly. At this step, a quantity, such as 5 wt. percent hydrogen may be added to the inert gas.

The host member with its inserted tubular cladding member 14 welded at 18 and with the bag 22 in position and welded at 24 and 26 forms a subassembly. After evacuation and filling the annular space 20 with an inert gas as above described, the subassembly is ready for the final stages of forming a cladded tubular member. The subassembly may now be returned to the mill and succeeding steps are employed as with a pierced billet completing the manufacture of a seamless tubular item. The subassembly is heated to a temperature at which bonding under pressure effectively occurs.

The essence of this invention is the application of liquid interface diffusion bonding to achieve metallic bonding of tubular products within the customary practices of hot rolling. LIDB requires temperatures above 1650° F., some contact pressure, and very clean conditions. The nickel base alloy can not be exposed to air above 2000° F. For this reason, the subassembly is heated to a temperature at which the bonded metal alloy 12 melts, which is in the range of about 1650° F. to 2000° F. When the bonded metal alloy is nickel phosphorus, the subassembly is heated to about 1950° F.

In the exemplary application of the invention wherein a cladded pipe is manufactured on a mandrel mill, a mandrel is inserted into the heated subassembly and pressure is applied between the tubular cladding member 14 and host member 10 to metallically bond the two materials together; that is, after the subassembly is heated to the required temperature. It is hot rolled by a bank of opposing rolls to metallically bond the cladding member 14 to the host member internal surface 10A. The host member is now internally clad. Thereafter, the clad tubular member is passed through the normal steps employed in manufacturing seamless pipe on a mandrel mill; that is stretched reduced to provide the preselected internal and external diameters and lengths. Afterwhich the clad pipe is cut to length, straightened, inspected, heat treated and so forth.

The use of bag 22 greatly facilitates the practice of important steps in the invention; that is, the bag makes it easy to remove oxygen and water from the annular space 20 and to prevent the reintroduction of such contaminants during heating in a non-atmosphere controlled furnace and during rolling. Additionally, the bag will expand during rolling in such a manner as to accept all gases being displaced from between the faying surfaces. After the cladding step has been completed, portions of the tubular cladding member 14 extending beyond the ends of the tubular host, and the bag 22, will be cut off and discarded. Thus, the bag 22 will be used only one time. Bag 22 does not need to have the shape illustrated. It may be arcuate in cross-sectional configuration, or it may be of a truncated conical shape. All that is necessary is an apparatus suitable to the tasks already listed.

The invention provides a unique process for manufacturing cladded tubular products which facilitates the employment of the standard seamless tubular manufacturing processes in use in the world today. The only additional steps necessary in the process not employed on the typical mill is the removal of the pierced billet for internally plating, the insertion and welding of the cladding member at one end, affixing the bag at the other end and removal of oxygen and water from the annular space. The subassembly is then returned to the standard manufacturing process, is heated and thereafter treated in the normal way employed in the finishing steps of producing seamless tubular goods.

Rolling equipment such as a reeler may readily be substituted for the mandrel mill. The exact equipment selected will be at the convenience of the steel mill. For very large diameter sizes, it is anticipated that a close fitting mandrel, made of a metal possessing a much higher coefficient of thermal expansion than the host, a metal such as stainless steel, can be used to clad with no recourse to rolling. The trade-off would be only a matter of economics and all selections would require the essence of the invention.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method of manufacturing an internally clad tubular product employing a tubular host having a first and a second end, comprising:
   (a) plating the internal surface of the tubular host with a low melting point bonded metal alloy;
   (b) inserting a tubular cladding member into the plated tubular host;
   (c) circumferentially welding one end of the cladding member and the tubular host and welding a circumferential bag between the second end of the tubular host and tubular cladding member to form a sealed subassembly;
   (d) evacuating the annular space and changing it with inert gas by attachment of apparatus to said bag in a manner to substantially remove all water and oxygen and to leave the annular space filled with the inert gas;
   (e) heating the subassembly from about 1,650° F. to about 2,000° F.; and
   (f) forming the heated subassembly in a mill to metallically bond the cladding member to the tubular host.

2. The method of manufacturing an internally clad tubular product according to claim 1 wherein the steps are carried out in conjunction with a standard mandrel mill method of manufacturing tubular products, steps (a) through (d) being added to the standard mandrel mill method.

3. The method of manufacturing an internally clad tubular product according to claim 1 wherein step (d) includes charging the evacuated annular space with argon.

4. The method of manufacturing an internally clad tubular product according to claim 1 wherein in step (a) said low melting point bonding metal alloy is nickel-phosphorus composed of about 88 to 98 percent by weight nickel and about 2 to 12 percent by weight phosphorus.

5. The method of manufacturing an internally clad tubular product according to claim 1 wherein step (a) includes submerging the tubular host in an electroless bath.

6. The method of manufacturing an internally clad tubular product according to claim 1 including the step of coating the exterior of the cladding member with a flux prior to step (b).

7. The method of manufacturing an internally clad tubular product according to claim 6 wherein the flux is composed essentially of cryolite.

8. The method of manufacturing an internally clad tubular product according to claim 1 wherein in step (a) the low melting point bonding metal alloy is composed of about 88 to 98 percent by weight nickel, about 2 to 12 percent by weight phosphorus and about 0.5 to 1 percent by weight boron.

9. The method of manufacturing an internally clad tubular product according to claim 1 wherein the tubular bag remains a part of the subassembly until the metallic bending of the cladding member to the tubular host is completed.

10. The method of manufacturing an internally clad tubular product according to claim 1 in which, after step (f) the tubular host having the cladding member metallically bonded thereto is stretch reduced to preselected OD and ID sizes.

11. The method of manufacturing an internally clad tubular product according to claim 1 wherein step (d) includes evacuating the annular space and charging it with an inert gas repeatedly until the oxygen and water level remaining within the annular space is below a level expressed by a dewpoint of about $-60°$ F.

12. The method of manufacturing an internally clad tubular product according to claim 1 wherein in step (e) the subassembly is heated to about 1925° F.

13. The method of manufacturing an internally clad tubular product according to claim 1 wherein in step (a) the internal surface at the tubular host is plated with a low melting point bonding metal alloy selected from the group comprising nickel phosphorus, nickel boron, nickel chromium phosphorus, chromium phosphorus and mixtures thereof.

14. For use in the manufacture of an internally clad tubular product a subassembly comprising:
   a tubular metallic host having a first and second end;
   a tubular metallic cladding member having a first and second end, the cladding member being telescopically received within said tubular host and having the first end thereof circumferentially welded to the first end of said tubular host;
   a metallic tubular bag welded to said tubular host adjacent the second end thereof and to said cladding member adjacent said second end forming a closed space including the annular area between the exterior of said tubular cladding member and the interior of said tubular host member, the tubular bag having a small diameter opening therein affording means of evacuating said closed space and the filling thereof with inert gas.

15. A subassembly according to claim 14 wherein said tubular metallic host is internally plated with a low melting point bonding metal alloy.

16. A subassembly according to claim 15 wherein said low melting point bonding metal alloy is selected from a group comprising nickel phosphorus, nickel boron, nickel chromium phosphorus, chromium phosphorus and mixtures thereof.

17. A subassembly according to claim 16 wherein said low melting point bonding metal alloy is nickel phosphorus composed of about 88 to 98 percent by weight nickel and about 2 to 12 percent by weight phosphorus.

18. A subassembly according to claim 17 wherein said low melting point bonding metal alloy is a compound comprising about 88 to 98 percent by weight nickel, about 2 to 12 percent by weight phosphorus and about 0.5 to 1 percent by weight boron.

19. A subassembly according to claim 14 wherein the exterior surface of said tubular cladding member is coated with a flux material.

20. A subassembly according to claim 19 wherein said flux material is composed essentially of cryolite.

21. A method of manufacturing an internally clad tubular product employing a tubular host having a cylindrical faying surface and tubular cladding member having a cylindrical faying surface, comprising:
   (a) plating one of the faying surfaces with a low melting point bonding metal alloy;
   (b) assemblying the tubular members one within the other so that their faying surfaces are juxtaposed;
   (c) circumferentially welding one end of the tubular host and the tubular cladding member;
   (d) welding a circumferential bag between the second end of the tubular host and tubular cladding member;
   (e) purging the annular space between the faying surfaces of oxygen and water by attachment of apparatus to said circumferential bag;
   (f) heating the assembled members to the melting temperature of the bonding metal alloy; and
   (g) applying pressure between the assembled tubular members to bond the faying surfaces.

22. The method of claim 21 wherein in step (e) the purging is carried out such that the water and oxygen with the annular space is at a level below a dew point of about $-60°$ F.

23. The method of claim 21 wherein step (g) is carried out in a rolling mill.

24. The method of claim 23 wherein step (g) is carried out in a mandrel mill.

25. The method of claim 21 wherein step (a) includes plating one of the faying surfaces with a metal alloy having a melting temperature of between about 1650° F. and 2000° F.

* * * * *